UNITED STATES PATENT OFFICE.

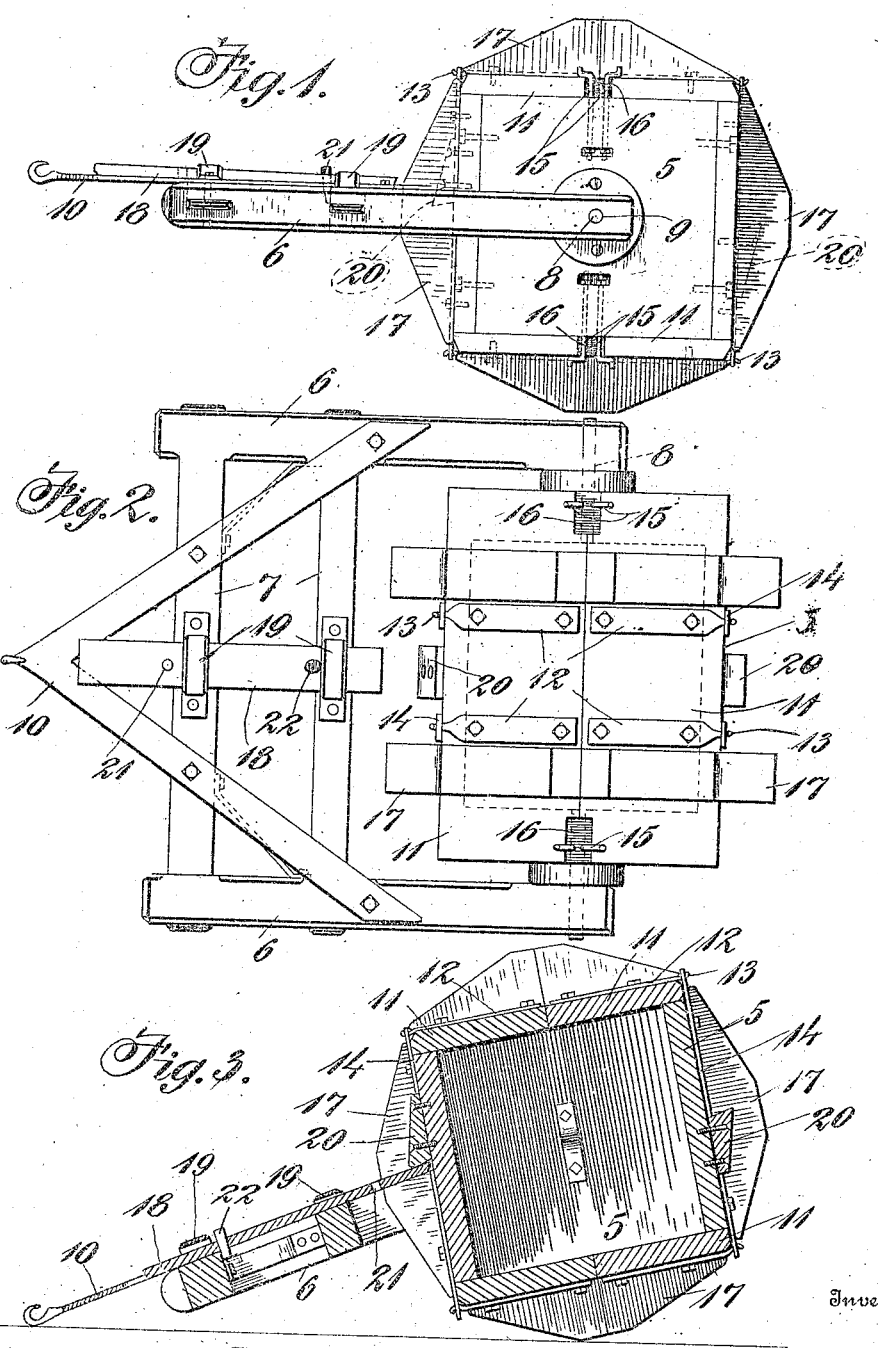

SAMUEL KNISLEY, OF PHILLIPSBURG, KANSAS.

CONCRETE-MIXER.

No. 891,345.  Specification of Letters Patent.  Patented June 23, 1908.

Application filed March 7, 1908. Serial No. 419,700.

*To all whom it may concern:*

Be it known that I, SAMUEL KNISLEY, a subject of King of England, residing at Phillipsburg, in the county of Phillips and State of Kansas, have invented certain new and useful Improvements in Concrete-Mixers, of which the following is a specification.

This invention relates to that class of concrete-mixers characterized by a rotatable receptacle in which the material is placed and mixed.

The object of the present invention is to provide a mixing receptacle which is so constructed that it can also be utilized to carry the material to the place of use. The receptacle is rolled over the ground, and is so constructed that this movement jars it sufficiently to properly mix the material.

In the accompanying drawing Figure 1 is a side elevation of the invention. Fig. 2 is a plan view. Fig. 3 is a longitudinal section.

Referring specifically to the drawing, 5 denotes a square box which is connected to a frame comprising parallel longitudinal side-bars 6 and cross-bars 7. The box is rotatably mounted between the side-bars behind the cross-bars, to the opposite ends of the box being secured journals 8 which are mounted in bearings 9 on the side-bars. At the front end of the frame is a suitable device 10 for attachment of the draft animals.

The material to be mixed is placed in the box, and the latter is dragged over the ground, it being shaped on the outside so that it will roll and jar when it is thus dragged in order that the material on the inside may be mixed.

Access to the box for filling or emptying the same is had by making two opposite side-walls thereof removable. Each of said removable side-walls comprises two sections 11. To the outside of each of said sections are secured straps 12 having at their outer ends hooks 13 which engage eyes in the outer ends of straps 14 secured to the outside of the adjacent side-walls of the box. The straps also serve to strengthen the box. The inner edges of the removable sections are engageable by catches 15 pivoted to the end walls of the box and said inner edges are recessed as indicated at 16 to afford a space for the catches to work in.

To the outside of the side-walls of the box, near each end thereof, are secured substantially triangular-shaped blocks 17 arranged so as to form a flange surrounding the box, which flange by reason of the shape of the blocks has a substantially octagonal-shaped perimeter. This perimeter of the flange is in contact with the ground, and by reason of its angular shape, the box is given a continuous jarring or shaking motion as it rolls over the ground so that the material therein is thoroughly mixed. The jarring and shaking of the box also prevents the material from sticking to the inside walls thereof. The apexes of the blocks 17 are flattened slightly to prevent cutting of the road. On the removable sides of the box, the blocks are halved, one-half being secured to each section 11.

In use, the box is positioned so that one of the removable sides will be on top, after which the sections 11 of said side are removed, and the material is placed in the box. The sections 11 are then replaced and locked by the catches 15. The box is then hauled around by the draft animals until the material is properly mixed, and it is then hauled to the place of use and dumped by removing the sections 11 of one of the removable sides and turning over the box by backing it.

For holding the box stationary while it is being filled I provide a brake device comprising a slide-bar 18 working under guide-straps 19 secured to the cross-bars 7. On the fixed sides of the box 5 are stop-blocks 20 which are engageable by the slide-bar. In said bar are holes 21 into either one of which is adapted to be stuck a pin 22 for locking the bar against longitudinal movement.

The brake device operates as follows: The supporting frame of the box is let down so that its front end rests on the ground as shown in Fig. 3, the box being previously rolled forwardly so that the slide-bar 18 may be engaged with the stop-block 20 as shown in Fig. 3. The slide-bar is then locked by sticking the pin 22 through one of the holes 21 behind the forward cross-bar 7. This locks the bar against outward movement, and by reason of its engagement with the stop-block, the box is held against rolling forwardly. Rearward rolling of the box, except to a very small extent not sufficient to interfere with the filling operation, is prevented by the engagement of the end of the side-bar with the flat side of the box adjacent the stop-block. When the box is being rolled over the ground, the slide-bar will be retracted and held locked in this position by sticking the pin 22 through one of the holes 21 in front of the rear cross-bar 7 as shown in Figs. 1 and 2, whereby the bar is locked in this position and held out of the path of the stop-block.

The apparatus herein described affords convenient and efficient means for mixing concrete or other material, it is simple in construction and can be easily operated, and by reason of the fact that the receptacle can be rolled to the place of use, there is considerable saving of time and labor. The blocks 17 are shown and described herein as forming a flange having a substantially octagonal-shaped perimeter but I wish it to be understood that I do not desire to be limited to this shape. The perimeter of the flange may have a different shape provided of course it is angular in order that the jarring and shaking motion of the receptacle may be had when it is rolled over the ground.

I claim:

A concrete-mixing apparatus comprising a supporting-frame, an angular receptacle journaled therein, flanges surrounding said receptacle and having an angular perimeter which is in contact with the ground, stop-blocks on the outside of the receptacle, and a slide-bar carried by the frame and adapted to engage the stop-block.

In testimony whereof I affix my signature, in presence of two witnesses.

SAMUEL KNISLEY.

Witnesses:
W. A. BARRON,
J. W. LAKE.